United States Patent [19]

Patton et al.

[11] Patent Number: 5,034,671
[45] Date of Patent: Jul. 23, 1991

[54] MANUAL DAMPER MOTOR CONTROL

[75] Inventors: Paul B. Patton, Rockford; Kenneth B. Kidder, Coon Rapids, both of Minn.

[73] Assignee: Honeywell Inc., Minneapolis, Minn.

[21] Appl. No.: 470,192

[22] Filed: Jan. 25, 1990

[51] Int. Cl.⁵ .............................................. G05B 11/32
[52] U.S. Cl. ..................................... 318/560; 318/562
[58] Field of Search ............... 318/560, 562, 565, 567, 318/256, 265, 266, 267, 293, 466, 467, 468; 236/1 G

[56] References Cited

U.S. PATENT DOCUMENTS

| 4,138,060 | 2/1979 | Iacono | 236/1 G |
|---|---|---|---|
| 4,143,811 | 3/1979 | Sattmann | 236/1 G |
| 4,379,985 | 4/1983 | Coppola | 318/293 |
| 4,389,014 | 6/1983 | Chow | 236/1 G |
| 4,399,940 | 8/1983 | Stiles | 236/1 G |
| 4,416,611 | 11/1983 | Zivny | 431/20 |
| 4,527,103 | 7/1985 | Kade | 318/293 |
| 4,549,233 | 10/1985 | Teranishi et al. | 318/265 X |
| 4,608,637 | 8/1986 | Okuyama et al. | 318/466 X |
| 4,706,194 | 11/1987 | Webb et al. | 318/466 X |
| 4,811,226 | 3/1989 | Shinohara | 318/466 X |

FOREIGN PATENT DOCUMENTS

| 2593276 | 7/1987 | France | 236/1 G |
|---|---|---|---|
| 2013428 | 8/1979 | United Kingdom | 318/265 |

OTHER PUBLICATIONS

"Flowline", Control and Instrumentation, Mar. 1975, p. 5.

Primary Examiner—Bentsu Ro
Attorney, Agent, or Firm—Edward Schwarz

[57] ABSTRACT

The position of the power output member of a motor actuator which is normally controlled by a microprocessor in response to system-supplied condition signals may be set manually by providing a manually controlled selector signal to the microprocessor allowing manually controlled adjustment signals rather than the normal condition signals to form the parameters from which is derived the motor control signal. In the preferred embodiment, a first switch generates the selector signal and a second switch generates the adjustment signal. Such apparatus allows a repairer or installer to adjust a mechanical positioning system driven by the motor actuator while the positioning system is in a variety of precisely selected positions. This control system contains a feature allowing one to change position of the motor actuator's power output member either continuously or incrementally by appropriately manipulating the switch which generates the adjustment signal.

11 Claims, 4 Drawing Sheets

MANUAL DAMPER MOTOR CONTROL

BACKGROUND OF THE INVENTION

Certain types of mechanical positioning systems have individual elements which are driven by a motor actuator. A typical such motor actuator comprises an electric motor driving a gear train having a power output shaft which positions the mechanical system. (The word "shaft" is used here, but it should be understood that linear motor actuators are also included. Throughout the discussion of the invention to follow the term "member" will be used to include both shafts driven in rotation and arms or racks driven linearly.) Typically the motor actuator is reversible so that the mechanical system ca be theoretically positioned at any orientation or position within the range of allowed motion. An example is the mechanical system which controls the flow of fuel and air to a burner such as is used in a furnace or boiler. It is important that the linkage be adjusted so that the proper stoichiometric ratio is maintained as closely as possible at all firing levels.

In such positioning systems it is frequently required during installation or maintenance to adjust the relationship between the various mechanical outputs of the system at a number of positions of the motor actuator power output shaft. Accordingly, it is convenient to be able to position the power output shaft at any desired orientation.

Heretofore the shaft position has typically been adjusted by use of a potentiometer which is switched into the circuit to replace the control resistance. There are a number of problems with this approach. The potentiometer, being an analog device, does not allow precisely incremented position changes. The accuracy with which the shaft can be position can be positioned depends upon the skill of the operator in adjusting the potentiometer. Frequently, the potentiometer may, after a period of years, become worn or dirty resulting in non-continuous changes in the potentiometer resistance. Lastly, it is also difficult to determine the shaft position as a function of potentiometer setting. Calibration of the potentiometer control shaft to indicate motor actuator shaft position is difficult and unreliable. Lastly, recent changes in the technology to solid state transducers and microprocessor-based controls tend to eliminate the control resistance entirely, and therefore the manual adjustment potentiometer approach is becoming obsolescent.

U.S. Pat. No. 4,143,811 shows a typical installation employing control circuitry for a motor actuator driving a flue damper as well as a valve controlling gas flow to a combustion chamber. Such a system can employ a potentiometer input to the control element to orient the position control system in the manner described as prior art above.

BRIEF DESCRIPTION OF THE INVENTION

As alluded to above, it is now very common to use a microprocessor to generate the control signals to the position control system. Such a microprocessor has at least one input port and an output port. The system designer programs the microprocessor to provide, responsive to an externally supplied condition signal provided at one of the microprocessor's input ports, control signals at the output port to the motor actuator so as to properly position the actuator's power output member or shaft. The power output member or shaft can be positioned under manual control by the use of a position source select signal generating means connected to an input port of the microprocessor and including a selector element for human manipulation. The position source select signal generating means provides a position source select signal having first and second states as the selector element is respectively in first and second positions. The position source select signal generating means may include a manually operable switch whose handle comprises the selector element, wherein the position source select signal generating means produces a position source select signal which has one or the other of two voltage levels according to the position in which the switch handle is placed.

Further, there is an adjustment signal generating means connected to an input port of the microprocessor and including an adjustment element which can be placed in a plurality of positions by human manipulation. The adjustment signal generating means provides an adjustment signal having a plurality of states as the adjustment element is respectively placed in its plurality of positions. The adjustment signal generating means can also include a manually operable switch means having a handle which comprises the adjustment element and producing adjustment signals of different voltages on two or more signal paths depending on the particular position in which the switch handle is placed.

The microprocessor is programmed to function as a member positioning means which responds to the position source select signal first state by providing a control signal at the output port dependent on the condition signal and for providing a control signal dependent on the adjustment signal provided by the adjustment signal generating means in response to the second state of the position source select signal. Therefore, it can be seen that the motor actuator's power output member can be driven to a desired position by placing the selector element in its second position and then by appropriately manipulating the adjustment element of the adjustment signal generating means.

Accordingly, one purpose of this invention is to allow precise position of a motor actuator power output member.

A second purpose is to provide a visual display precisely indicating the member's position.

Yet another purpose is to allow incremental movement of the power output member so as to allow the operator to precisely achieve a desired position of the member.

Another purpose is to allow manual positioning of the member over the full range of movement of the A further purpose is to provide such a positioning system which is integrated with a microprocessor implementing a positioning algorithm based on an externally supplied demand signal.

Other purposes will become apparent from the following description of the invention.

DESCRIPTION OF THE PREFERRED EMBODIMENT

Figure 1:
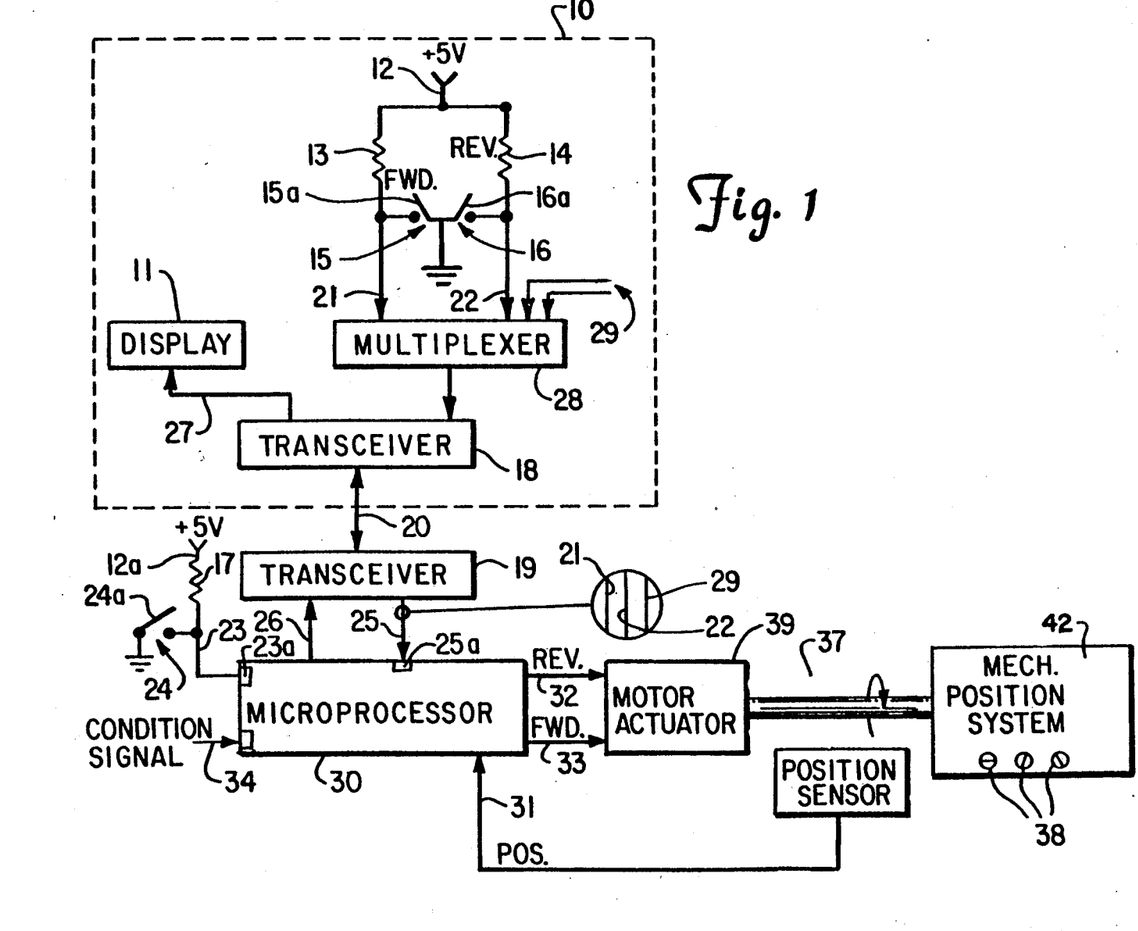
FIG. 1 shows a block diagram of the microprocessor control element and a schematic of the circuit elements which are under human manipulation when adjusting the position of motor actuator output member.

The circuit shown in FIG. 1 relies for its proper functioning both on conventional circuit elements and also on a properly programmed microprocessor. The microprocessor provides the overall control function and implements both the operational control of member position dependent on a demand signal and the adjustment function dependent on manual inputs. While the microprocessor functions are software-dependent, it should be realized that in fact every function is actually performed by hardware within the microprocessor itself. It is typically the case that functions are performed sequentially in time and that these functional elements may share in time the individual physical or circuit elements within the microprocessor which implements them. This of course is well known to those skilled in the art. Particularly with respect to FIG. 3, the preferred embodiment is shown as hardware rather than the actual commercial software implementation we contemplate so as to allow those skilled in the art to more easily practice the invention using either implementation.

FIG. 1 shows a control system in combined functional block and circuit diagram whose key element for operation is a microprocessor 30 which provides signals on paths 32 and 33 to a motor actuator 39 having a power output member 37 for controlling the orientation or position of a mechanical positioning system 42 responsive to various selection, adjustment and condition signals received on paths 23, 25 and 34 respectively. Microprocessor 30 has a plurality of input ports 23a, 25a, and 34a at which paths 23, 25 and 34 supply the signals which they carry to microprocessor 30. The condition signal on path 34 may be a composite of data from a number of sources indicating how member 37 should be positioned during normal or automatic operation. The adjustment signals on path 25 indicate the desired changes in position under manual member position control. The selection signal on path 23 selects the source of the signals on which microprocessor 30 bases its control signals on paths 32 and 33 as either being the adjustment signals on path 25 or the condition signal on path 34. Microprocessor 30 may be any of the various familiar models now available on the market from a number of different sources.

The control panel 10 may be remotely located from microprocessor 30 with connections between them handled by transceivers 18 and 19 which communicate via a data path 20. Transceiver 18 will typically not hav sufficient input channels or bit signal paths to simultaneously accept all of the various signals generated by the signal sources within control panel 10 in addition to the manual adjustment signals which it transmits to transceiver 19. It is thus convenient to use a multiplexer 28 to collect these signals from their various sources and provide them as an input to transceiver 18. Data paths 21, 22, and 29 carry these signals and are shown as inputs to multiplexer 28. Multiplexer 28 may be a local (to the control panel 10) microprocessor having a number of other functions in addition to its multiplexing functions. Transceivers 18 and 19 may comprise so called UARTs (universal asynchronous receiver-transmitter) which implement the RS-485 communication protocol and communicate with each other serially. They and multiplexer 28 operate under the control of microprocessor 30, which provides control signals to transceivers 18 and 19 and multiplexer 28 on path 26. In this well known protocol, microprocessor 30 directs multiplexer 28 to sense the condition of its input signals on paths 21, 22, and 29 at intervals of a few milliseconds, typically on a group by group basis, and selects the group to be transmitted to its input port 25a. In general, the speeds of which currently available multiplexers and microprocessors are capable insure that changes in states of these bit signals will be communicated to the microprocessor 30 within a few milliseconds or so under almost all conditions, a speed which is essentially instantaneous for the manually generated signals here involved In any case, it is convenient to consider the communication function by which these signals are transmitted to microprocessor 30 as being essentially transparent both to the signal sources in control panel 10 and to the microprocessor 30. This is shown symbolically by the blown up segment of path 25 showing data paths 21, 22, and 29 as part of the signals carried on path 25. Hereafter in the discussion of this invention, the various signals on paths 21, 22, and 29 will be discussed as though they are provided as direct inputs to microprocessor 30 even though this is not the case in the actual embodiment. Since the invention itself is only peripherally involved with these communication-related details, no loss of generality results from this assumption.

The control panel 10 includes a display 11 receiving a signal on path 27 from microprocessor 30 via transceivers 19 and 18 which encodes the physical orientation or position of a power output member 37. display 11 provides a visible indication of the member 37 position information of the signal on path 27. Control panel 10 has a power supply 12 for powering the various components of panel 10. Power supply 12 is shown only symbolically as a +5 v. input although of course any voltage compatible with the elements in the system will be suitable. There is also a +5 v. power supply 12a which supplies voltage to direct inputs of microprocessor 30.

The manual inputs to the control system which are of interest in understanding the invention here are under the control of two momentary open switches 15 and 16 and a stable position switch 24 and these switches' respective pull-up resistors 13, 14 and 17. Switches 15, 16 and 24 have manually operable selector elements (handles) 15a, 16a, and 24a by which the switches are closed by the operator, and in the case of switch 24, opened as well. The individual pull-up resistors 13, 14 and 17 are connected between their +5 v. supplies and signal paths 21, 22 and 23. The switches 15, 16 and 24 are connected between these signal paths 21, 22 and 23 and ground. When a switch is in its closed position, its associated signal path is grounded through the switch and a 0 v. level is present on the signal path. When a switch is in its open position, the voltage applied to its associated signal path is held at the +5 v. level by the associated pull-up resistor 13, 14, or 17. Depending on the logic circuit family involved, the 0 v. level may be interpreted as either a Boolean or logical 0, or a Boolean or logical 1. For simplicity's sake, and also because the actual commercial embodiment employing this invention does so, the 0 v. level will be interpreted to denote a Boolean 0 value and the +5 v. level will be interpreted as a Boolean 1. It should be understood that a particular voltage level and the associated Boolean value is strictly arbitrary, and there is no intent here to limit the invention to the signal voltage-Boolean value relationships assumed.

Selector switch 24 selects either the so called "run" condition or the "test" condition corresponding respectively to the operational mode of microprocessor 30 employing the demand signal on path 34 to determine the state of the control signals or to a manual adjustment mode employing the signals on paths 21 and 22 as controlled by switches 15 and 16. When the manually operable selector element or handle 24a of switch 24 is in the open position as shown in FIG. 1, the +5 v. signal available on path 23 and applied to input port 23a of microprocessor 30 may correspond to the operational mode. When handle 24a is moved to the closed position, then the 0 v. signal level which switch 24 applies to path 23 may invoke the manual adjustment mode where the microprocessor bases its power output member positioning signals on paths 32 and 33 on the signals carried on paths 21 and 22 from control panel 10.

Arbitrarily, one can designate switch 15 when open and resistor 13 is providing a +5 v. signal on path 21 as indicating that the motor actuator power output member 37 should be driven in a forward direction. Similarly, one can arbitrarily designate switch 16 and resistor 14 to provide the signal specifying that the motor actuator power output member 37 should be driven in a reversed direction when switch 16 is open to create a signal level of +5 v. on path 22. When both switches 15 and 16 are in their normal closed position and paths 21 and 22 both carry 0 v. signals, this may be taken to specify that the motor actuator power output member 37 position should not change. Thus there are in essence three different states of interest for these two switches 15 and 16, viz. switch 15 open and switch 16 closed, switch 15 closed and switch 16 open, and both switches 15 and 16 closed.

Microprocessor 30 during its normal or operational mode as selected by switch 24 uses the condition signal provided on input port 34 along with previously loaded constant values and an appropriate algorithm executable by the microprocessor 30, as the basis for providing control signals to a motor actuator 39 via control signal paths 32 and 33. Motor actuator 39 includes the earlier-mentioned power output member or shaft 37 which actually conveys power to position the mechanical elements of a system 42. The double ended, curved arrow indicates that member 37 is rotated by motor actuator 39 in either reverse or forward directions. When it is necessary to manually control the position of member 37, then switch handle 24a is manipulated to its closed position to select the alternate adjustment signal sources which switches 15 and 16 comprise on which to base the control signal value.

Typically, there will be a number of adjustments which must be made to the elements of the positioning system 42 while the system is in a number of different positions. These adjustment elements are shown symbolically as adjustment screws 38 but, for example, might be screws which may be turned to change the profile of a cam. In fact this is the precise application for which the invention was developed, where the power output member 37 controls the position of a damper in an air supply duct to a fuel burner, and such an adjustable profile cam controls the fuel flow rate to the burner through interaction with a cam follower. Each of the screws needs to be adjusted when under and controlling the cam follower so as to allow the most efficient operation possible of the burner.

A position sensor 36 is located in sensing relationship to member 37 and provides a signal encoding the actual position of member 37 on path 31 to microprocessor 30. Position sensor 36 may comprise a simple potentiometer whose rotor or wiper is fastened to member 37 so that as member 37 moves, the resistance of the potentiometer changes. It is also possible to use optical or magnetic takeoffs from member 37 which are not mechanically connected to the member. At frequent intervals microprocessor 30 provides a signal encoding the position of member 37 to the display 11 as encoded in the signal on path 31 via transceivers 19 and 18 and data path 27. This permits the operator to instantly determine the position of member 37.

Figure 2:
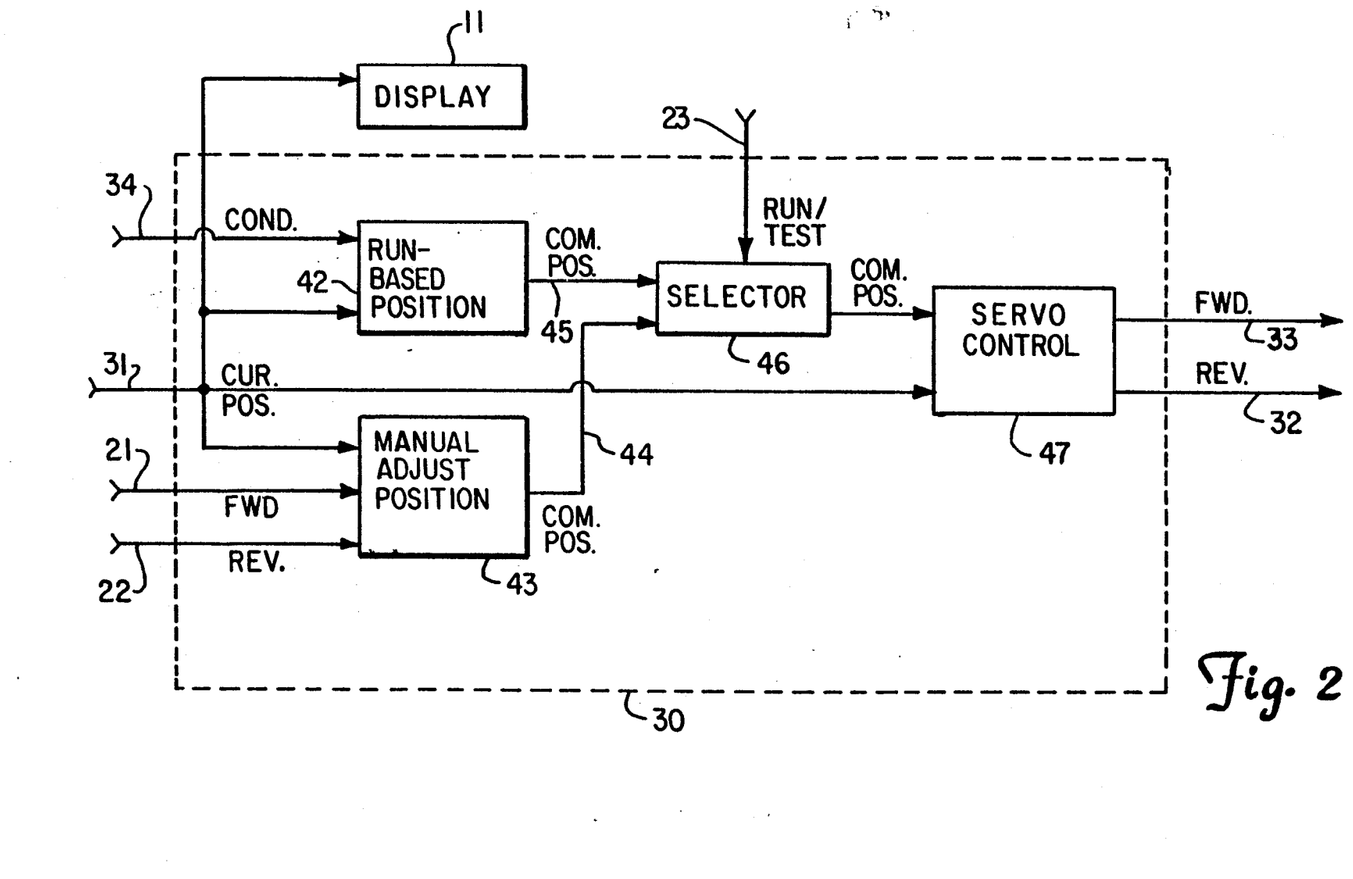
FIG. 2 is a functional block diagram of the internal elements of the microprocessor which control the position of the power output member.

FIG. 2 shows the functional block elements within microprocessor 30 which pertain to this invention. It should be noted that each of these elements are in fact implemented within microprocessor 30 by software routines which are stored in different selected instruction storage locations within microprocessor 30. In the normal or run mode, a commanded position is encoded in a signal on path 45 by run-based position element 42. This commanded position is typically derived from the current position as encoded in the signal on path 31 and from a condition signal encoded on path 34. The condition signal itself is typically a composite of several individual signals. There may be, for example, signals indicating turn on and turn off temperatures and current temperature encoded in what is shown as a single condition signal on path 34.

The manual adjust position element 4 receives the current position value encoded in the signal on path 31, as well as the status of switches 15 and 16 as encoded on the signal on paths 21 and 22, respectively. (Recall the earlier discussion that the signals on paths 21 and 22 are multiplexed and actually presented as a part of the signal carried on data path 25 from multiplexer 28 through transceivers 18 and 19 to microprocessor 30.) Responsive to the signals o paths 21 and 22, element 43 derives a commanded position value encoded in the signal on path 44.

Both the commanded position on path 44 and the commanded position on path 45 are provided as inputs to a selector element 46. Element 46 provides one of these two commanded positions as its output to a servo control element 47. The commanded position signal which is selected by selector element 46 is dependent on the position of the run/test switch 24 as indicated by the signal carried on path 23. Servo control element 47 receives the current position on path 31 as well as the commanded position encoded in the signal provided by selector element 4 and generates the appropriate signals on paths 32 and 33 to respectively command the motor actuator 39 of FIG. 1 to reposition member 37.

Figure 3:
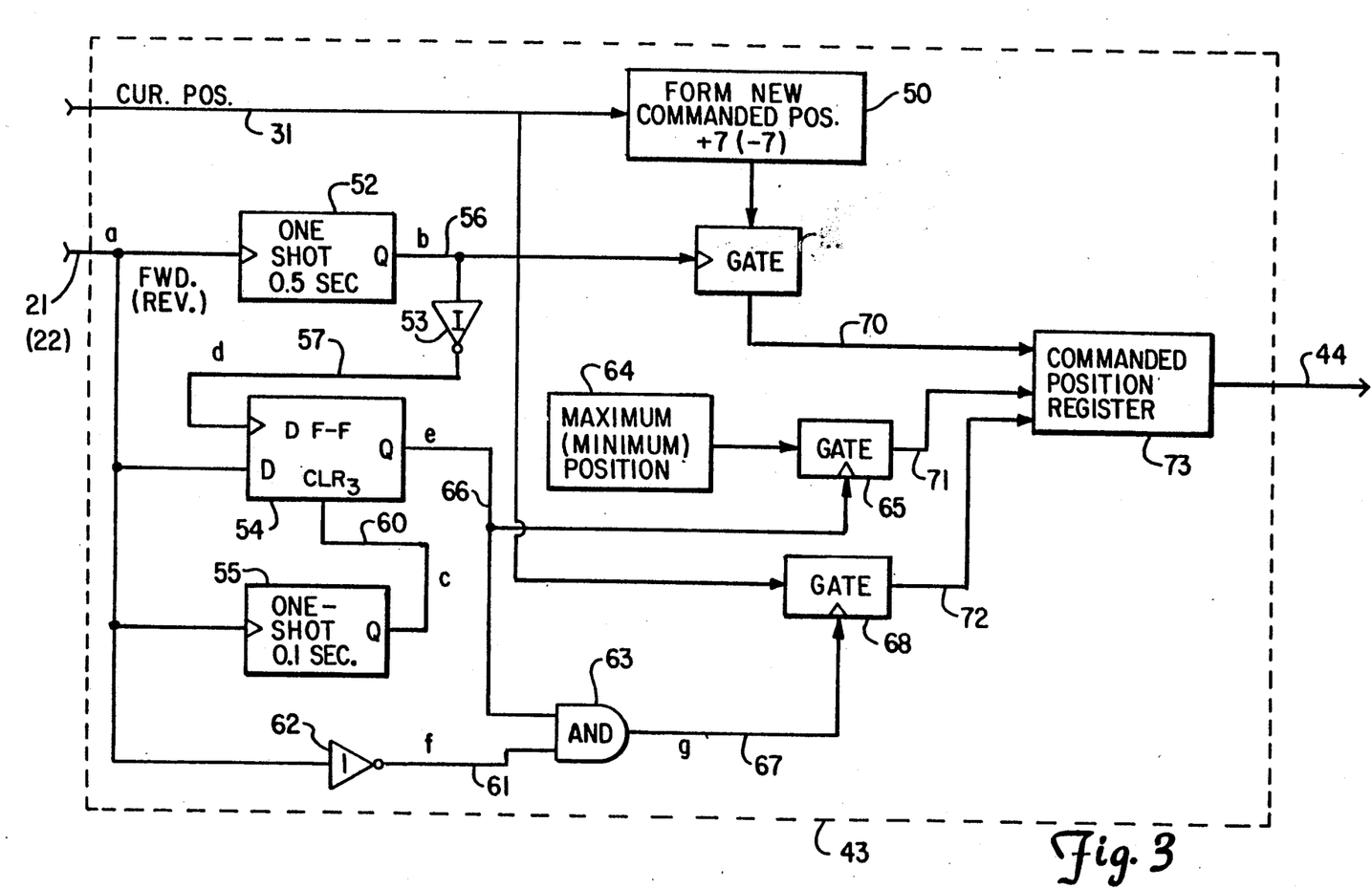
FIG. 3 is a combined logic and functional block diagram of the position adjustment element of FIG. 2.

FIG. 3 shows the manual adjust position element 43 of FIG. 2 as a logic schematic. The logic schematic shows the preferred structural embodiment of the details of the invention. These functions are, in fact, implemented within microprocessor 30 by the software, although, of course, one does not normally think of individual instructions for a microprocessor as implementing individual logic elements. It is believed that presenting this portion of the invention in this format will assist those skilled in the art to develop either the hardware implementation shown or to develop the individual software implementation for the embodiment which best suits their needs. In particular, those skilled in the art can easily derive the necessary software elements from the logic circuit schematic shown to implement the invention Again, it should be emphasized that the preferred commercial implementation contemplated by the applicants here is as software within microprocessor 30. This implementation, in essence, replicates the individual logic elements and functional elements shown in FIG. 3.

To understand the structure and function of FIG. 3, it is necessary to understand the way in which the position of member 37 is controlled by actuator 39. As previously mentioned, the mechanical positioning system 42 for which this system was designed is a fuel burner where the mechanical positioning system controls flow of both air and fuel to the combustion chamber. It was determined that acceptable precision can be achieved in the commercial system for which this invention was designed by providing for 400 different equally spaced position increments or units of member 37. However, the number of increments over the control range is a matter of the designer's choice based on the requirements of the system. Further, in order to prevent unnecessary small adjustments of member 37 position (see FIG. 2), servo control element 47 provides no control signals on paths 32 and 33 to cause the position of member 3 to change so long as the difference between the commanded position from selector 46 and the current position encoded in the signal on path 31 are no further apart than a preselected number of position increments, 6 in the commercial embodiment, from each other. This choice for the dead band within which there is no position change commanded is also a matter of design choice. Therefore, the servo control element 47 provides appropriate signals on paths 32 or 33 to cause actuator 39 to change the position of member 37 to reduce the difference between the commanded position as encoded on the signal from selector 46 and the current position as encoded in the signal on path 31 whenever this difference is greater than 6, or whatever number is desirable, position increments.

The apparatus of FIG. 3 allows for two different modes of operation. One mode causes the member to change position by one position increment. The other mode causes the position of member 37 to change continuously. Further, the reader should note that FIG. 3 deals with the control of member 37 position changes both in the forward and reverse directions. The schematic of FIG. 3 shows a control system which functions to change the position of member 37 in its forward direction. A second control apparatus nearly identical to that shown in FIG. 3, but incorporating the parenthetical changes shown in functional elements 50 and 64 is necessary to allow member 37 to move in its reverse direction. A last note about FIG. 3: the ">" symbol at the input of one-shots 52 and 55 and D flip-flop 54 implies that the input is positive-going edge or transition sensitive, i.e., the logic element responds only to changes in signal level from 0 v. to a level in the vicinity of +5 v.

Figure 4:
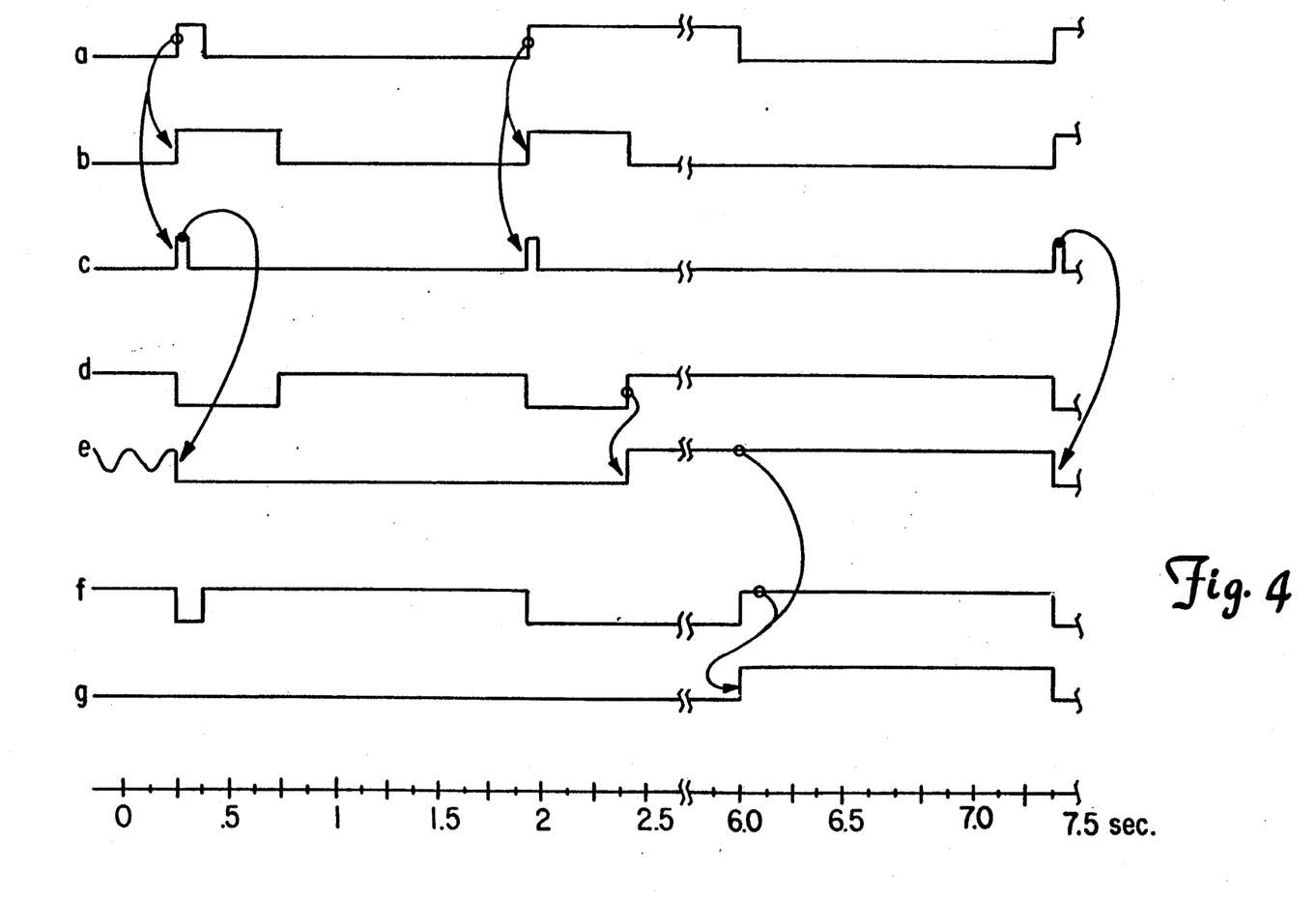
FIG. 4 shows waveforms useful in understanding the operation of the apparatus shown in FIG. 3.

FIG. 4 represents various signal waveforms associated with the logic circuitry of FIG. 3. The lower case letters adjacent a number of signal paths in FIG. 3 identify the corresponding waveforms in FIG. 4 carried by the signal path. The scale at the bottom is in seconds and approximately represents the real time operation of a commercial embodiment of this inventions. Note that a portion of the scale between 2.5 and 6 sec. is omitted.

The curved lines emanating from small circles on various points of the waveform and terminating with arrows pointing at segments of other waveforms indicates coincidence in time and a cause and effect relationship. Individual points on a waveform will be identified by the waveforms letter immediately followed by the approximate time instant from the scale at the bottom of FIG. 4, so, for example, the first low to high transition of waveform "a" will be denoted with the expression "a.25". Lastly, it is conventional and makes for easy understanding if the more positive signal level represents a Boolean or logical 1 and the lower level represents a logical or Boolean 0. Of course, the designer has a wide range of options in terms of the relationship between the signal levels produced and the corresponding Boolean logic values.

Turning first to the elements shown in FIG. 3 which pertain specifically to the step mode of operation of this apparatus, the forward adjustment signal carried on path 21 is applied to the input of one-shot 52 One-shot 52 responds to each low to high signal level transition on path 21 by providing for the 0.5 sec. time period specified for one-shot 52, a logical 1 or high level on path 56. The forward adjustment signal on path 21 has a low to high transition at point a 0.25. In response to this signal transition, one-shot 52 provides a signal shown as waveform b in FIG. 4 with similar low to high transition at b.25 and then a transition from a high to low logic level 0.5 sec. later at b.75. The arrows with curved bodies between waveform a and waveforms b and c imply a cause and effect relationship between the waveform a transition and the waveform b and c transitions.

A signal encoding the current position value of member 37 is constantly present in the signal on path 31 provided to an increment position generating element 50. This current position value is an integral value between 0 and 400. Element 50 forms the sum of 7 units and this current position value and provides a signal encoding this sum as the data input to a gate 51. The output of one-shot 52 is provided on path 56 to an edge sensitive control input of gate 51. The low to high transition at the control input of gate 51 causes the new commanded position formed by adding 7 to the current position value, to be gated on path 70 to a commanded position register 73. Thus, after the transition at waveform b.25, the current position value plus 7 will be present in the commanded position register 73. The servo control element 47 of FIG. 2 subtracts the current position value from the commanded position value contained in register 73 to arrive at a difference of 7. Since this difference is greater than 6, a control signal is placed on path 33 causing motor actuator 39 to begin changing the position of member 37 in the forward direction. Servo control element 47 maintains the control signal on path 33 until the difference between the current position value on path 31 and the contents of commanded position register 73 is 6 units or less. That condition causes servo control element 47 to change the control signal on path 33 to stop movement of member 37. Thus, it can be seen that for each time switch 15 is opened, a new value is loaded into register 73 comprising the current position value plus 7 units. It can thus be seen that in this increment mode of operation, member 37 is moved at least one, and typically 2 to 4, incremental units each time the switch handle 15a (FIG. 1) is moved from the switch closed to the switch open position. This occurs regardless of the time elapsed between successive opening and then closing of switch 15. If switch element 15a is released within 0.5 sec., then no other value is loaded into register 73, and member 37 moves the few incremental units which step mode operation causes.

Whether a manipulation of switch element 15a results in operation in the step mode or in passing on to the continuous mode of operation depends on whether switch 15 is held in the open position for less than or longer than 0.5 sec. Continuous mode operation involves both one-shot 52 and register 73, as well as the remaining logic elements in FIG. 3 not yet discussed. The output of one-shot 52, shown as waveform b in FIG. 4, is applied to the input of an inverter 53 whose output on path 57 is applied to the edge sensitive control input of a D flip-flop 54. Waveform d is the complement of waveform b. D flip-flop 54 is a conventional logic element which, when there is a low to high transition at its control input provided by path 57, transfers the logic level at its D input and provided on path 21, to the Q output on path 66. Therefore, if after 0.5 sec. following any low to high transition the signal on path 21 still has the high or Boolean 1 level, then this level is provided by the Q output of flip-flop 54 on path 66. Such a transition is shown at approximately a2.4. The logic signals on paths 57 and 66 are shown by waveforms d and e respectively in FIG. 4 with the curved arrow from the low to high transition at d2.4 identifying the low to high transition at e2.4 caused by it.

It is necessary in this mode to assure that D flip-flop 54 is always initially cleared. To accomplish this, one-shot 55 receives as its input the forward adjustment signal on path 21 and shown as waveform a. One shot 55 has in this embodiment a nominal time constant of 0.1 second, and in any case this time constant should be less than the time constant of one-shot 52. Each time switch 15 is actuated by a user causing switch 15 to open and the signal on path 21 to become high, one-shot 55 provides for 0.1 sec. a high signal level on path 60 to the clear input of D flip-flop 54. This causes flip-flop 54 to clear and its Q output on path 66 to be set to the low or logical 0 level. The output of one-shot 55 is shown as waveform c. Such events in the one-shot 55 output are shown at c.25 and c2.0, with the corresponding level from flip flop 54 shown at e.25 and e2.0. The waveform between e0 and e.25 indicates an indeterminate level.

The low to high transition on path 66 causes the gate 65 to transfer the maximum position value stored in register 64 to register 73 through signal path 71. The maximum position for the commercial embodiment contemplated here is 400, although it can be any particular value desired. This value is preset in some storage location within the memory of microprocessor 30 and which performs the function of storage element 64. Typically, the user or programmer will preset this value in the system. With the maximum position value loaded into register 73, element 47 of FIG. 2 will continuously provide a control signal on path 33 causing motor actuator 39 to move member 37 in a forward direction towards its maximum position.

When the operator removes his or her finger from switch 15 the signal on path 21 changes from a high to a low level as is shown at waveform a6.0. Inverter 62 receives the adjustment signal on path 21 and provides the inversion or complement of waveform a on path 61 as waveform f. The transition from low to high at waveform segment f6.0 along with the high logic level of waveform e on path 66 satisfies both inputs of AND gate 63 causing a transition on path 67 in waveform g at g6.0. This transition on path 67 from low to high enables gate 68 causing the current position value encoded in the signal on path 31 to be gated to commanded position register 73 via path 72. In response to this new commanded position, the servo control element 47 senses that the commanded position and the current position are identical or very nearly so, and in any case, that the difference is less than 6 units. In response to this, the control signal on path 33 is changed by control element 47 so that motor actuator 39 no longer causes member 37 to move. In this way, these elements cause the member 37 to move continuously from the time switch 15 is opened by actuating until switch 15 is again closed by releasing it.

The reader should note that the operation of the system elements for moving member 37 in the reverse direction under manual control is identical to that just described whether operating in step or continuous mode. Only the direction-controlling digital set point values are different.

Having thus described our invention, what we wish to claim by letters patent is:

1. In a motor actuator of the type having a power output member which is driven in a manner specified by control signals applied to the motor actuator, and including a microprocessor having at least one input port and an output port, said microprocessor programmed to provide the control signals at the output port responsive to an external condition signal provided at one of said input ports, an improvement allowing manual control of the power output member position, comprising:
   (a) position source select signal generating means including a selector element for human manipulation, for providing a position source select signal having first and second states as the selector element is respectively in first and second positions; and
   (b) adjustment signal generating means connected to an input port of the microprocessor and including an adjustment element to be placed in a plurality of positions by human manipulation, for providing an adjustment signal having a plurality of states as the adjustment element is respectively placed in its plurality of positions;
   wherein the microprocessor includes member positioning means responsive to the position source select signal first state for providing a control signal at the output port dependent on the condition signal and for providing a control signal dependent on the adjustment signal responsive to the position source select signal second state,
   whereby the power output member is driven to a desired position by manipulation of the selector element to its second position and by manipulation of the adjustment element.

2. The improvement of claim 1, wherein the adjustment signal generating means includes means for providing the adjustment signal having a first state when the adjustment element is in a first position, and wherein the member positioning means includes means for providing control signal to the motor actuator to drive the power output member in a first direction responsive to the adjustment signal first state.

3. The improvement of claim 2, including position sensing means in sensing relationship to the power output member, for providing a position signal encoding the value of the power output member's current position, and display means receiving a signal encoding the current position value encoded in the position signal and providing a visual indication of the power output member's current position.

4. The improvement of claim 2, wherein the member positioning means includes timing means receiving the adjustment signal for sensing the interval length during which the adjustment element is in its first position, and responsive to said interval length being less than a predetermined duration, providing a control signal to the motor actuator causing a predetermined incremental displacement of the power output member in the first direction.

5. The improvement of claim 4, wherein the timing means includes means providing a control signal to the motor actuator driving the power output member through a predetermined incremental displacement in the first direction responsive to a predetermined duration of said interval length of less than approximately one-half second.

6. The improvement of claim 2, wherein the motor actuator includes position sensing means in sensing relationship to the power output member for providing to a microprocessor input port a current position signal encoding a current position value specifying the current position of the power output member; wherein the microprocessor further includes position command means receiving the adjustment and position signals and responsive to the adjustment signal first state and the position source select signal first state, for providing a command position signal encoding a command position value greater than a first predetermined offset from the current position value; and wherein the member positioning means includes means responsive to the command position and current position signals for providing control signals driving the member in a direction reducing the difference between the command position and the current position values.

7. The improvement of claim 6, wherein the position command means further comprises timing means responsive to the adjustment signal for sensing the interval length during which the adjustment signal is in its first state, and providing a command position signal encoding a command position value no greater than a second predetermined offset from the current position value responsive to said interval length being less than a predetermined duration; and wherein the member positioning means includes means providing control signals to the motor actuator causing movement of the power output member only when the difference between the command position value and the current position value is greater than the first predetermined offset.

8. The improvement of claim 6, wherein the position command means further comprises timing means receiving the adjustment signal for providing a command position signal to the member positioning means encoding a command position value greater than the first predetermined offset from the current position value for so long as the adjustment signal first state exists.

9. The improvement of claim 2, wherein the adjustment signal generating means includes means for providing an adjustment signal having second and third states different from the first state and each other when the adjustment element is in respectively second and third positions, and wherein the member positioning means includes means receiving the adjustment signal for providing a control signal to the motor actuator to drive the power output member in a direction different from the first direction responsive to the adjustment signal second state and to freeze the power output member current position responsive to the adjustment signal third state.

10. The improvement of claim 2, wherein the position select signal generating means comprises manually operable switch means having a handle comprising the selector element, and wherein the adjustment signal generating means comprises manually operable switch means having a handle comprising the adjustment element.

11. A method for operating a motor actuator of the type having a power output member which is driven in a manner specified by control signals applied to the motor actuator, and including a microprocessor having at least one input port and an output port, said microprocessor programmed to provide the control signals at the output port responsive to an external condition signal provided at one of said input ports, and further including apparatus allowing manual control of the power output member position, comprising:

(a) position source select signal generating means including a selector element for human manipulation, for providing a position source select signal having first and second states as the selector element is respectively in first and second positions; and (b) adjustment signal generating means connected to an input port of the microprocessor and including an adjustment element to be placed in first, second, and third positions by human manipulation, for providing an adjustment signal having first, second, and third states as the adjustment element is respectively placed in its first, second, and third positions.

wherein the microprocessor includes member positioning means responsive to the position source select signal first state for providing a control signal at the output port dependent on the condition signal and for providing a control signal specifying responsive to the position source select signal second state, first and second directions of movement of the power output member responsive respectively to the first and second states of the adjustment signal and freezing the power output member in its current position responsive to the adjustment signal's third state, whereby the power output member may be driven to and frozen in a desired position by manipulation of the selector element to its second position and by manipulation of the adjustment element, wherein the method comprises a series of steps including manipulation of the apparatus allowing manual control of the power output member position to facilitate adjustment of the elements of a mechanical positioning system which is connected to and driven by the power output member, including the steps of manipulating the selector element to its second position and the adjustment element to its first, second, and third positions a plurality of times; and after selected events of manipulating the adjustment element to its third position, adjusting the mechanical elements of the positioning system.

* * * * *